United States Patent
Hudson

(10) Patent No.: US 8,164,475 B2
(45) Date of Patent: Apr. 24, 2012

(54) DOWNHOLE COMMUNICATION

(75) Inventor: Steven Martin Hudson, Dorset (GB)

(73) Assignee: Expro North Sea Limited, Berkshire (GB)

( * ) Notice: Subject to any disclaimer, the term of this patent is extended or adjusted under 35 U.S.C. 154(b) by 1364 days.

(21) Appl. No.: 11/720,443

(22) PCT Filed: Nov. 28, 2005

(86) PCT No.: PCT/GB2005/004551
§ 371 (c)(1),
(2), (4) Date: May 30, 2007

(87) PCT Pub. No.: WO2006/059079
PCT Pub. Date: Jun. 8, 2006

(65) Prior Publication Data
US 2008/0007422 A1   Jan. 10, 2008

(30) Foreign Application Priority Data
Dec. 3, 2004   (GB) .................................. 0426594.8

(51) Int. Cl.
*G01V 3/00* (2006.01)
(52) U.S. Cl. .................................. 340/854.4; 340/853.2
(58) Field of Classification Search ............... 340/853.2, 340/854.4; 166/66, 206, 382; 175/40
See application file for complete search history.

(56) References Cited

U.S. PATENT DOCUMENTS

| | | | |
|---|---|---|---|
| 4,160,970 A * | 7/1979 | Nicolson | 340/854.6 |
| 4,788,544 A | 11/1988 | Howard | |
| 4,839,644 A | 6/1989 | Safinya et al. | |
| 4,857,831 A | 8/1989 | Davies et al. | |
| 5,394,141 A | 2/1995 | Soulier | |
| 5,448,227 A * | 9/1995 | Orban et al. | 340/854.4 |
| 6,577,244 B1 * | 6/2003 | Clark et al. | 340/854.6 |
| 6,657,597 B2 | 12/2003 | Rodney et al. | |
| 6,909,666 B2 * | 6/2005 | Dubinsky et al. | 367/81 |
| 2002/0084913 A1 * | 7/2002 | Hudson et al. | 340/853.1 |

FOREIGN PATENT DOCUMENTS

EP   0 314 654   5/1989

OTHER PUBLICATIONS

International Search Report for PCT Application No. PCT/GB2005/004551; Filed Nov. 28, 2005; Date of Completion Mar. 8, 2006; Date of Mailing Mar. 16, 2006.
European Search Report for European Application No. 0426594.8; Filed Dec. 3, 2004.
Written Opinion for PCT Application No. PCT/GB2005/004551; Filed Nov. 28, 2005; Date of Completion Mar. 8, 2006; Date of Mailing Mar. 16, 2006.
Response to Written Opinion dated Sep. 29, 2006.

* cited by examiner

*Primary Examiner* — David Bagnell
*Assistant Examiner* — Benjamin Fiorello
(74) *Attorney, Agent, or Firm* — Alston & Bird LLP

(57) ABSTRACT

A downhole signal receiving system where a pair of setting devices (51) are used to electrically connect with downhole structure and are connected to one another by a bulk conductor (52). Signals are extracted by using a detecting means (53) that does not interrupt the conduction path. The tool provides a low impedance conduction path along which signals from the surrounding structure can flow to facilitate detection.

18 Claims, 1 Drawing Sheet

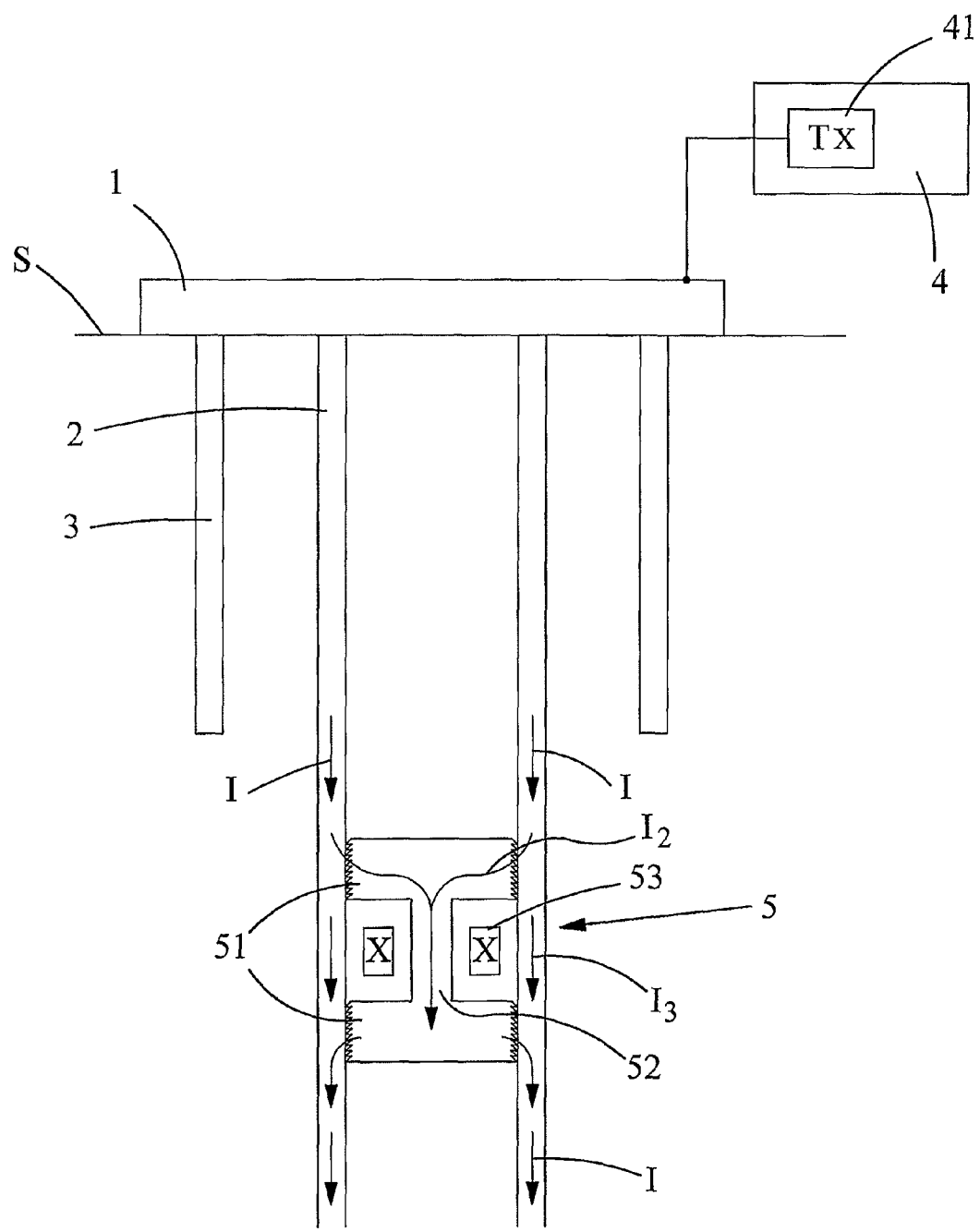

DOWNHOLE COMMUNICATION

This invention relates to downhole communication.

Various systems of cableless downhole communication have been proposed but there is a continuing need to provide systems and apparatus which simplify the installation and operation of such systems.

One particular system is described in U.S. Pat. No. 5,394,141. In this case a method of transmission of signals from a downhole location is described where contact is made between surrounding metallic structure, typically tubing in a well, at two spaced locations. These locations are separated by a large distance to allow the technique to work. In U.S. Pat. No. 5,394,141 it is stated that it is desirable to provide a spacing of at least 9 metres and preferably much more than this between the contacts to give good operation. Whilst it is discussed in less detail in U.S. Pat. No. 5,394,141 the idea of receiving signals using two such contacts spaced by such a large distance is also mentioned. Where a system such as that described in U.S. Pat. No. 5,394,141 is used for receiving signals there will be a large impedance between the spaced contacts. One of these contacts is connected to one input or terminal of a component such as an amplifier and the other contact is connected to another input or terminal of the component, e.g. amplifier.

A particular problem with putting the ideas of U.S. Pat. No. 5,394,141 into practice, is that it is difficult to install two contacts separated by the large distances required to make the system of U.S. Pat. No. 5,394,141 function.

It is an object of the present invention to provide apparatus which allows the reception of signals downhole without the need for having contacts spaced by such large distances.

According to one aspect of the present invention there is provided a downhole signal receiving tool comprising a pair of electrically conductive setting means spaced from one another in a longitudinal direction of the tool, electrical conductor means connected between the setting means, and current detecting means arranged for detecting current flowing in the electrical conductor means, the arrangement being such that if the tool is set within current carrying metallic structure at least part of the current will flow along a path comprising the pair of setting means and the electrical conductor means allowing detection of said current.

According to another aspect of the present invention there is provided downhole data communication apparatus comprising, a signal generator for applying a signal current to metallic structure, and a signal receiving tool comprising a pair of electrically conductive setting means spaced from one another in a longitudinal direction of the tool, electrical conductor means connected between the setting means, and current detecting means arranged for detecting current flowing in the electrical conductor means, the arrangement being such that if the tool is set within metallic structure to which current is applied, at least part of the current will flow along a path comprising the pair of setting means and the electrical conductor means allowing detection of said current.

According to yet another aspect of the present invention there is provided a downhole data communication system comprising metallic structure of a downhole installation, a signal generator arranged to apply a signal current to the metallic structure, and a signal receiving tool, the system being arranged for signaling between the signal generator and the signal receiving tool using the metallic structure as a signal channel, wherein the signal receiving tool comprises a pair of electrically conductive setting means spaced from one another in a longitudinal direction of the tool, electrical conductor means connected between the setting means, and current detecting means arranged for detecting current flowing in the electrical conductor means, and wherein the tool is set within the metallic structure and arranged such that at least part of any signal current flowing in the metallic structure flows along a path comprising the pair of setting means and the electrical conductor means allowing detection of the signal current and hence communication.

The use of setting means to provide the electrical contacts with the metallic structure gives the good conduction path needed to allow this type of receiving tool to work. Connections via conductive packers or other simple contacts will not give a good enough conduction path.

The expression setting means is used to refer to an arrangement which can be used to "set" or fix the tool within a surrounding structure. Setting tools, devices and means per se are well known for use in installing tools in downhole locations. In general, to "set" a tool requires that the tool be held firmly in place against its own weight and/or other forces that will or may act on the tool. Parts of setting means will generally be forced into contact with surrounding structure in the setting process. The setting means may tend to bite into the surrounding surface. The setting means may cause deformation of the surrounding structure in the setting process. These phenomenon can help to provide a low contact resistance between the tool and the structure into which it is set.

Preferably the electrical conductor means provides a low impedance path between the spaced setting means. This can help to ensure that the distance between the setting means can be minimised whilst still being successful in receiving signals. It will be appreciated that the impedance of the path is low during signal reception. Generally the impedance of the path will be low at all times.

The tool may be arranged so that the impedance of the path through the tool from one setting means to the other is of similar order to that of the section of the metallic structure that will be disposed between the setting means when the tool is installed.

Preferably the tool is arranged so that the impedance of the path is lower than that of the corresponding section of the metallic structure.

The current detecting means may be arranged to surround the electrical conductor means. The current detecting means may comprise a toroid. A toroid can be used in the detection of alternating current. The current detecting means may comprise a Hall effect device, which can be used for detecting alternating and/or direct current. The current detecting means may comprise a magnetostrictive device. These types of detecting means can be considered non-invasive. There is no break in the conductor means caused by the introduction of a detecting means.

The metallic structure will typically comprise tubing, for example one of production string, drill string, casing or liner tubing. Often the tubing will comprise sections which are joined together.

Preferably the spacing between the pair of setting means is minimised. Preferably the spacing between the pair of setting means is smaller than the length of one section of tubing. Preferably the spacing between the setting means is less than 9 metres. Preferably the spacing between the setting means is less than 5 metres. More preferably still the spacing between the setting means is less than 2 metres.

Reducing the spacing between the setting means allows the length of the tool to be minimised which is generally desirable for reasons of ease of manufacture, installation and operation.

An embodiment of the present invention will now be described by way of example only with reference to the accompanying drawing which schematically shows a well including a downhole communication system comprising a downhole receiving tool.

The drawing schematically shows a well comprising a well head 1 provided at the surface S and production tubing 2 leading downhole and surrounded by casing 3. The well head 1, production tubing 2 and casing 3 each form part of the metallic structure of the well installation. It will be appreciated that both the casing 3 and production tubing 2 comprise generally cylindrical metallic tubing. In both cases this tubing is provided in lengths or sections which are joined together by means of interengaging threads. The actual length of such sections of tubing can vary depending on different installations but each section of tubing will typically be in the order of 9 metres in length.

It will be appreciated that when establishing a well it is necessary to feed down lengths of tubing and join these together in the well. Generally speaking the longer an item is, that needs to be installed in the well, the more difficult it is to achieve this. Therefore, in particular, if it is necessary to install items in the well which are significantly longer than one section of tubing this can present installation difficulties.

The well shown in the drawing also comprises a data communication system comprising a surface unit 4 which is electrically connected to the metallic structure of the well via the well head 1 and comprises a signal generator 41 for applying data signals to the metallic structure. The data communication system further comprises a downhole signal receiving tool 5 which is disposed downhole within the production tubing 2.

More particularly, the downhole receiving tool 5 is firmly set in position within the production tubing by means of a pair of setting means 51 which are provided at opposite ends of the tool 5.

Each of the setting means 51 can have a generally conventional structure of the type commonly used in the oil and gas industry for setting tools within a tubular structure. Generally speaking each setting tool will comprise a plurality of parallel sets of teeth which are driven into the surrounding tubing 2 using wedges. There are a large number of different methods available for forcing such teeth into the surrounding tubing 2 and these include the use of pyrotechnic, hydraulic, and atmospheric sources of drive. However, the exact means by which the setting means 51 achieve setting of the tool 5 in the production tubing 2 is of no great relevance to the present idea. What is important however, is that both setting means 51 are electrically conductive and are activated such that they are driven into intimate contact with the surrounding tubing 2 such that not only is good mechanical contact achieved but also good electrical contact.

The downhole tool 5 further comprises a conductor 52 giving a low impedance electrical connection between the two setting means 51. Since the two setting means 51 are also electrically conductive, there is a low impedance electrical conduction path from the production tubing 2 where it meets a first of the setting means 51 to the portion of the production tubing 2 where it meets the other setting means 51, via the setting means themselves 51 and the conductor 52.

Current detecting means 53, which in this embodiment comprises a toroid, is provided around the conductor 52 and arranged to detect any current flowing through the conductor 52.

Although not shown in the drawings the tool 5 will also comprise other components such as actuators for controlling devices within the well, sensors for sensing parameters such as pressure and temperature, control circuitry and perhaps signaling means.

In operation of the data transmission means, the surface unit 4 applies signals to the metallic structure 1, 2, 3 by operation of the signal generating means 41 and this causes current to flow along the metallic structure and, in particular, along the production tubing 2 as indicated by the arrows I included in the drawing. When this current I meets the first setting means 51, i.e. that which is uppermost in the drawing, part of the current $I_2$ will flow into the tool 5 via the first setting means 51, whereas the remainder of the current $I_3$ will continue flowing in the production tubing 2. The current $I_2$ flowing into the tool via the first setting means 51 will rejoin the main current flow I in the production tubing 2 via the second setting means 51. Of course, the total current flow I, reaching the tool, will be equal (ignoring losses) to the sum of the current $I_2$ flowing through the tool 5 and that flowing past the tool $I_3$ in the corresponding section of production tubing.

When current $I_2$ is flowing through the tool 5, this can be detected by the current detecting means 53 and hence a signal as transmitted by the surface unit 4 may be received by the tool 5 and thus data may be transmitted.

The challenge however, is to ensure that a sufficient amount of current flows through the tool 5 rather than it all just progressing past the tool without leaving the production tubing 2. In achieving this, the low contact resistance between the tool and production tubing 2 provided by the setting means 51 is of vital importance. Further, it is important to ensure that the setting means 51 and conductor 52 provide a low impedance path through the tool. This can be achieved by ensuring that both the setting means 51 and the conductor 52 comprise a metal having good electrical conduction characteristics and provide a current flow path having a good cross-sectional area. In practice this may be achieved by the use of steel components and maximising the diameter of the conductor and cross-sectional area of the setting means in the direction which is perpendicular to the intended current flow.

It will be noted that the conductor 52 is a body of bulk conductive material and there are no electrical or electronic components such as amplifiers or so on in the conduction path between the setting means.

It should be noted that the effectiveness of the receiving tool of the present application is in general terms independent of the overall length of the tool or the separation between the setting means 51 and therefore it is desirable to minimise the separation between the setting means 51 to provide a tool which has minimised overall length to aid in installation and operation.

In the embodiment described above, a toroid is used in the current detecting means 53 because the signal generating means 51 is arranged for applying alternating currents to the metallic structure. In alternatives a signal detecting means making use of a Hall effect device or a magnetostrictive device can be used in which case the apparatus may be used with alternating current and/or direct signaling current.

Using a toroid gives significantly better performance in noisy conditions but has a lower frequency limit. It has been determined by the applicants that the toroid may be successfully used in a technique of this kind for detecting signal currents having a frequency as low as 0.25 Hz. It should be noted that generally as frequency increases, the proportion of current that can be persuaded to flow through the tool 5 will reduce. However, it should be noted that this also applies to noise signals in the circuit and therefore the signal to noise ratio of the current flowing through the tool 5 is not so adversely affected as the level of current itself. This helps to make this technique practical.

In general, in a specific implementation the frequency used for sending data where a toroid is being used for detection purposes, will be chosen by way of compromise between the need to have a high enough frequency for the toroid to operate effectively and a low enough frequency to ensure that a good proportion of signal flows through the tool 5.

As will be clear to most readers a toroid as referred to in this application comprises a ring of magnetic material carrying a winding which is wound around the material of the ring such that it passes through the central aperture of the ring, over the body of the material making up the ring, and then back through the central aperture and so on. Current flowing in this winding may then be detected to achieve detection of the current flowing in the conductor 52.

In each case above the detection means is provided in a way in which the conduction path through the tool is uninterrupted by components of the detection means. This in distinction to a situation where for example there is isolation between the two contacts at the ends of the tool and/or the contacts connect to opposing terminals of an amplifier.

The invention claimed is:

1. A downhole signal receiving tool comprising a pair of electrically conductive setting means for holding the tool in position within metallic structure, each of the pair of setting means being arranged to bite into a surrounding surface when the tool is set within metallic structure and being spaced from one another in a longitudinal direction of the tool, the downhole signal receiving tool further comprising electrical conductor means connected between the setting means, and current detecting means arranged for detecting current flowing in the electrical conductor means, the arrangement being such that if the tool is set within current carrying metallic structure at least part of the current will flow along a path from one of the pair of setting means to the other of the pair of setting means via the electrical conductor means, allowing detection of said current, wherein said path is free of any electronic components.

2. A downhole signal receiving tool according to claim 1 in which each setting means comprises a plurality of teeth for contacting with structure surrounding the tool.

3. A downhole signal receiving tool according to claim 1 which is arranged for use in the metallic structure comprises tubing.

4. A downhole signal receiving tool according to claim 3 wherein the tubing comprises sections which are joined together.

5. A downhole signal receiving tool according to claim 4 wherein the spacing between the pair of setting means is smaller than the length of one section of tubing.

6. A downhole signal receiving tool according to claim 1 wherein the spacing between the setting means is less than 9 meters.

7. A downhole signal receiving tool according to claim 1 wherein the spacing between the setting means is less than 5 meters.

8. A downhole signal receiving tool according to claim 1 wherein the spacing between the setting means is less than 2 meters.

9. A downhole signal receiving tool according to claim 1 wherein the impedance of the path through the tool from one setting means to the other is of similar order to that of the section of the metallic structure that will be disposed between the setting means when the tool is installed.

10. A downhole signal receiving tool according to claim 1 wherein the tool is arranged so that the impedance of the path through the tool from one setting means to the other is lower than that of the corresponding section of the metallic structure.

11. A downhole signal receiving tool according to claim 1 wherein the current detecting means is arranged to surround the electrical conductor means.

12. A downhole signal receiving tool according to claim 1 wherein the current detecting means comprises a toroid.

13. A downhole signal receiving tool according to claim 1 wherein the current detecting means comprises a Hall effect device.

14. A downhole signal receiving tool according to claim 1 wherein the current detecting means may comprise a magnetostrictive device.

15. A downhole data communication apparatus comprising, a signal generator for applying a signal current to metallic structure, and a signal receiving tool comprising a pair of electrically conductive setting means for holding the tool in position within metallic structure, each of the pair of setting means being arranged to bite into a surrounding surface when the tool is set within metallic structure and being spaced from one another in a longitudinal direction of the tool, electrical conductor means connected between the setting means, and current detecting means arranged for detecting current flowing in the electrical conductor means, the arrangement being such that if the tool is set within a metallic structure to which current is applied, at least part of the current will flow along a path from one of the pair of setting means to the other of the pair of setting means via the electrical conductor means allowing detection of said current, wherein said path is free of any electronic components.

16. A downhole data communication system comprising metallic structure of a downhole installation, a signal generator arranged to apply a signal current to the metallic structure, and a signal receiving tool, the system being arranged for signaling between the signal generator and the signal receiving tool using the metallic structure as a signal channel, wherein the signal receiving tool comprises a pair of electrically conductive setting means for holding the tool in position within the metallic structure, each pair of setting means being arranged to bite into a surrounding surface of the metallic structure and being spaced from one another in a longitudinal direction of the tool, the signal receiving tool further comprising electrical conductor means connected between the setting means, and current detection means arranged for detecting current flowing in the electrical conductor means, and wherein the tool is set within the metallic structure and arranged such that at least part of any signal current flowing in the metallic structure flows along a path from one of the pair of setting means to the other of the pair of setting means via the electrical conductor means allowing detection of the signal current and hence communication, wherein said path is free of any electronic components.

17. A method of downhole data communication comprising the steps of: setting within metallic structure of a well installation, a downhole signal receiving tool comprising a pair of electrically conductive setting means for holding the tool in position within the metallic structure, each of the pair of setting means being arranged to bite into a surrounding surface when the tool is set within the metallic structure and being spaced from one another in a longitudinal direction of the tool, the downhole signal receiving tool further comprising electrical conductor means connected between the setting means, and current detecting means arranged for detecting current flowing in the electrical conductor means, the arrangement being such that if the tool is set within current carrying metallic structure at least part of the current will flow along a path from one of the pair of setting means to the other of the pair of setting means via the electrical conductor means, allowing detection of said current, wherein said path is free of any electronic components; applying signals to metallic structure at a location remote from the receiving tool; and receiving those signals at the receiving tool.

18. A downhole signal receiving tool comprising a pair of electrically conductive setting devices for holding the tool in position within metallic structure, each of the pair of setting devices being arranged to bite into a surrounding surface when the tool is set within metallic structure and being spaced from one another in a longitudinal direction of the tool, the downhole signal receiving tool further comprising an electrical conductor member connected between the setting devices, and a current detector arranged for detecting current flowing in the electrical conductor member, the arrangement being such that if the tool is set within current carrying metallic structure at least part of the current will flow along a path from one of the pair of setting devices to the other of the pair of setting devices via the electrical conductor member, allowing detection of said current, wherein said path is free of any electronic components.

* * * * *